(12) United States Patent (10) Patent No.: US 8,885,617 B2
Burhan (45) Date of Patent: Nov. 11, 2014

(54) METHODS AND DEVICES FOR EMPLOYING A MODULATION AND CODING SCHEME FOR A DATA BLOCK

(75) Inventor: Abeezar A. Burhan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/617,359

(22) Filed: Sep. 14, 2012

(65) Prior Publication Data

US 2014/0064256 A1 Mar. 6, 2014

Related U.S. Application Data

(60) Provisional application No. 61/697,156, filed on Sep. 5, 2012.

(51) Int. Cl.
*H04W 72/04* (2009.01)
*H04L 1/00* (2006.01)
*H04L 1/18* (2006.01)

(52) U.S. Cl.
CPC ......... *H04W 72/0446* (2013.01); *H04L 1/0003* (2013.01); *H04L 1/1887* (2013.01)
USPC ........................................................ 370/336

(58) Field of Classification Search
CPC ........................ H04W 72/0446; H04L 1/0003
USPC ......................................... 370/229, 230, 336
See application file for complete search history.

(56) References Cited

U.S. PATENT DOCUMENTS

| 7,366,254 | B2 | | 4/2008 | Chang et al. | |
|---|---|---|---|---|---|
| 7,489,703 | B2 | | 2/2009 | Western | |
| 7,656,969 | B2 | * | 2/2010 | Strong | ........................ 375/316 |
| 8,295,370 | B2 | * | 10/2012 | Thurfjell et al. | .............. 375/259 |
| 2004/0081248 | A1 | * | 4/2004 | Parolari | ........................ 375/259 |
| 2005/0190745 | A1 | | 9/2005 | Western et al. | |
| 2007/0287444 | A1 | * | 12/2007 | Hulkkonen et al. | ....... 455/422.1 |

(Continued)

OTHER PUBLICATIONS

Ericsson: "Clarifications and Corrections of DL and UL-SCH Data Transfer", 3GPP Draft; R2-084562 Clarifications and Corrections of DL and UL-SCH Data Transfer, 3rd Generation Partnership Project (3GPP), Mobile Competence Centre; 650, Route Des Lucioles ; F-06921 Sophia-Antipolis Cedex; France, vol. RAN WG2, No. Jeju Island; 20080818, Aug. 19, 2008, XP050420582, [retrieved on Aug. 19, 2008].

(Continued)

*Primary Examiner* — Min Jung
(74) *Attorney, Agent, or Firm* — QUALCOMM IP Department; James Hunt Yancey, Jr.

(57) ABSTRACT

Access terminals are adapted to employing a modulation and coding scheme for a data block in various circumstances. For instance, an access terminal may determine that there is a conflict with at least some transmission timeslots of a radio block on which a data block is to be transmitted. In response to the determined conflict, the access terminal can employ a modulation and coding scheme for the data block. In some instances, the modulation and coding scheme may be changed from a previously selected scheme in response to the conflict. In other instances, the modulation and coding scheme may be initially selected in response to the conflict. With the modulation and coding scheme employed, some of the RF bursts of the data block can be transmitted during transmission timeslots of the radio block that are not conflicted. Other aspects, embodiments, and features are also claimed and described.

30 Claims, 7 Drawing Sheets

(56) References Cited

U.S. PATENT DOCUMENTS

| | | |
|---|---|---|
| 2008/0205648 A1 | 8/2008 | Hanov et al. |
| 2009/0086685 A1* | 4/2009 | Aghili et al. ............ 370/336 |
| 2009/0116589 A1* | 5/2009 | Zhang et al. ............ 375/341 |
| 2009/0232158 A1* | 9/2009 | Frank et al. ............ 370/466 |
| 2009/0307554 A1 | 12/2009 | Marinier et al. |
| 2010/0142491 A1* | 6/2010 | Dubreuille et al. ........ 370/336 |
| 2011/0096823 A1 | 4/2011 | Sahara |
| 2012/0076068 A1* | 3/2012 | Zhao et al. ............ 370/312 |
| 2013/0083763 A1* | 4/2013 | Futagi et al. ........... 370/329 |
| 2013/0170469 A1* | 7/2013 | Yu et al. ............... 370/330 |

OTHER PUBLICATIONS

International Search Report and Written Opinion—PCT/US2013/057658—ISA/EPO—Oct. 28, 2013.

Samsung: "Impact of DL CQI RS Insertion on Rel-8 PDSCH Performance", 3GPP Draft; R1-091230, 3rd Generation Partnership Project (3GPP), Mobile Competence Centre; 650, Route Des Lucioles; F-06921 Sophia -Antipolis Cedex ; France, No. Seoul, Korea; 20090318, Mar. 18, 2009, XP050338844, [retrieved on Mar. 18, 2009].

Sunplus MMobile Inc: "Report of [64b: 10] email discussion on HARQ process for TTI Bundling", 3GPP Draft; R2-091390 Report of [64B 10] Email Discussion on HARQ Process for TTI Bundling, 3rd Generation Partnership Project (3GPP), Mobile Competence Centre; 650, Route Des Lucioles; F-06921 Sophia-Antipolis Cedex; France, vol. RAN WG2, No. Athens, Greece; 20090209-20090213, Feb. 3, 2009, XP050604383, [retrieved on Feb. 3, 2009].

* cited by examiner

R – Receive
T – Transmit
M – Measure

METHODS AND DEVICES FOR EMPLOYING A MODULATION AND CODING SCHEME FOR A DATA BLOCK

CROSS REFERENCE TO RELATED APPLICATION & PRIORITY CLAIM

The present application for patent claims priority to Provisional Application No. 61/697,156 entitled "METHODS AND DEVICES FOR EMPLOYING A MODULATION AND CODING SCHEME FOR A DATA BLOCK" filed Sep. 5, 2012, and assigned to the assignee hereof and hereby expressly incorporated by reference herein as if fully set forth below and for all applicable purposes.

TECHNICAL FIELD

Embodiments of the present invention relate generally to wireless communication, and more specifically, to methods and devices for facilitating throughput at access terminals in a wireless communications system by selectively employing a modulation and coding scheme for a data block.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

As access terminals operate within a wireless communications system, each access terminal may conduct one or more periodic activities. This can conflict with active uplink transmissions by the access terminal (e.g., transmissions from the access terminal to the wireless communications system). In some instances, these conflicts may result in the cancellation of one or more transmission opportunities by access terminals until the periodic activity is completed. As a result, access terminal operations can be delayed potentially causing degraded device performance and user experience.

BRIEF SUMMARY OF SOME EXAMPLES

Embodiments of the present invention are provided to address the issues discussed above as well as others. For example, in some instances, the cancellation of one or more transmission opportunities by the access terminal pending completion of a conflicting activity can affect the throughput at the access terminal. Various features and aspects of the present disclosure are adapted to reduce or even eliminate loss of an entire data block as a result of the lost transmission opportunities. According to at least one aspect of the present disclosure, access terminals may include a communications interface and a storage medium coupled with a processing circuit. The processing circuit can be adapted to detect a conflict with at least some transmissions timeslots of a radio block on which a data block is to be transmitted. The processing circuit may employ a modulation and coding scheme for the data block in response to the detected conflict. A portion of the data block can be transmitted via the communications interface during transmission timeslots of the radio block that are not conflicted.

Further aspects provide methods operational on an access terminals and/or access terminals including means to perform such methods. One or more examples of such methods may include determining that there is a conflict with at least some transmission timeslots of a radio block on which a data block is scheduled to be transmitted. A modulation and coding scheme may be employed for the data block in response to the determination that there is a conflict, and a portion of the data block can be transmitted during transmission timeslots of the radio block that are not conflicted.

Still further aspects include computer-readable mediums comprising programming operational on an access terminal. According to one or more examples, such programming may be adapted for determining that there is a conflict with at least some transmission timeslots of a radio block on which a data block is to be transmitted. In response to the determination that there is a conflict, the programming may be adapted to employ a particular modulation and coding scheme for the data block. The programming may further be adapted for transmitting a portion of the data block during transmission timeslots of the radio block that are not conflicted.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the disclosure are described below for GSM systems, and related terminology may be found in much of the following description. However, those of ordinary skill in the art will recognize that one or more aspects of the present disclosure may be employed and included in one or more other wireless communication protocols and systems.

Figure 1:
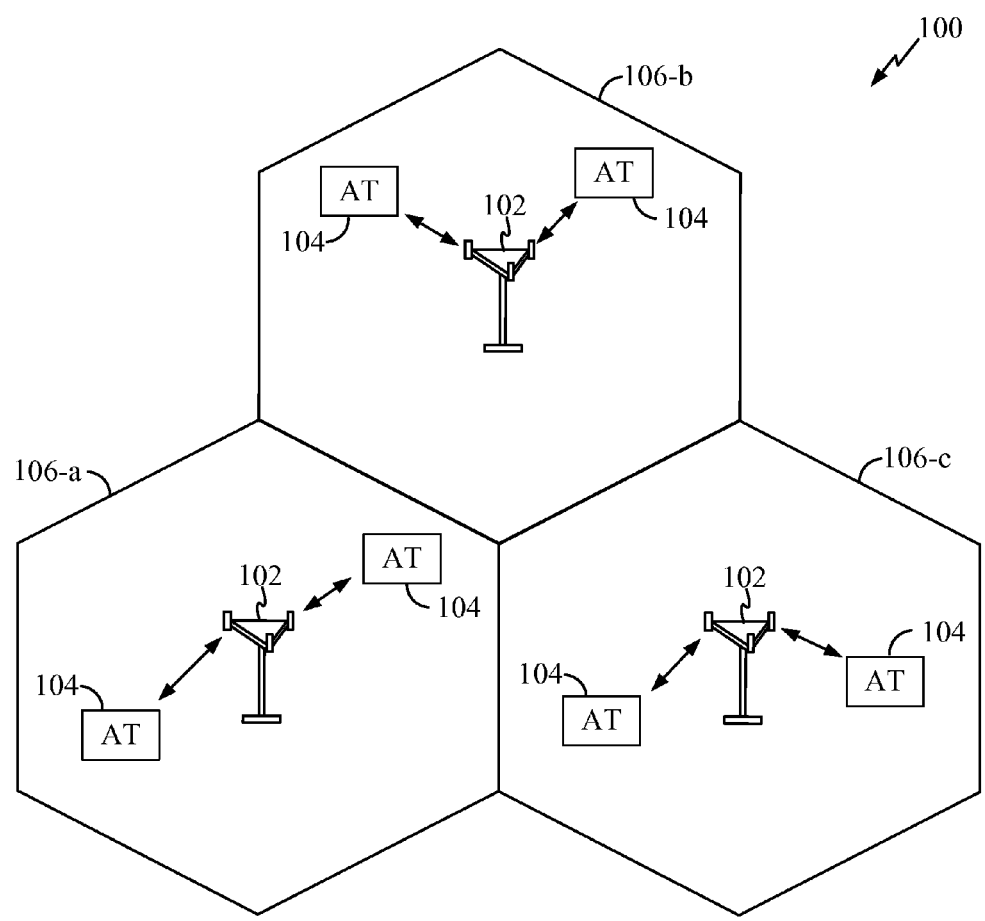
FIG. 1 is a block diagram illustrating an example of a network environment in which one or more aspects of the present disclosure may find application.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

Figure 2:
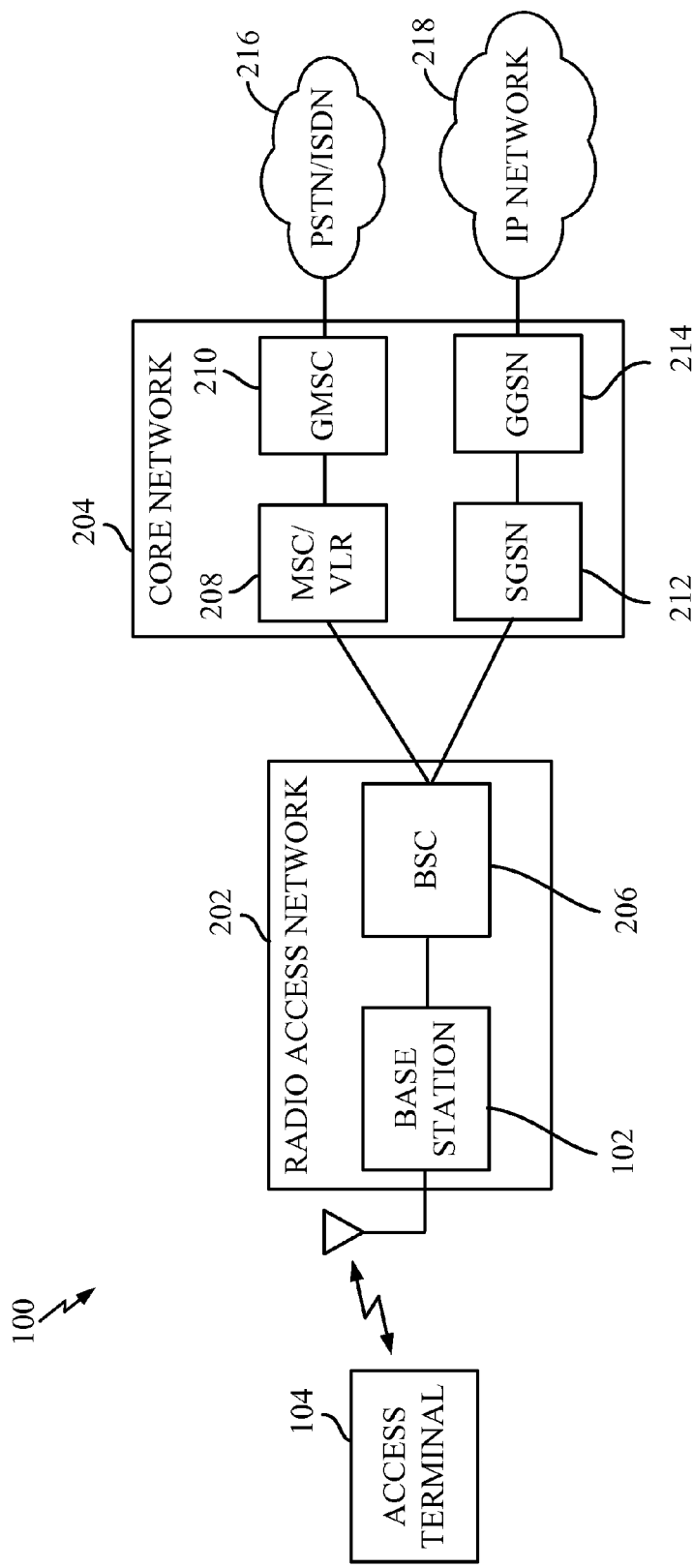
FIG. 2 is a block diagram illustrating select components of the wireless communication system of FIG. 1 according to at least one example.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
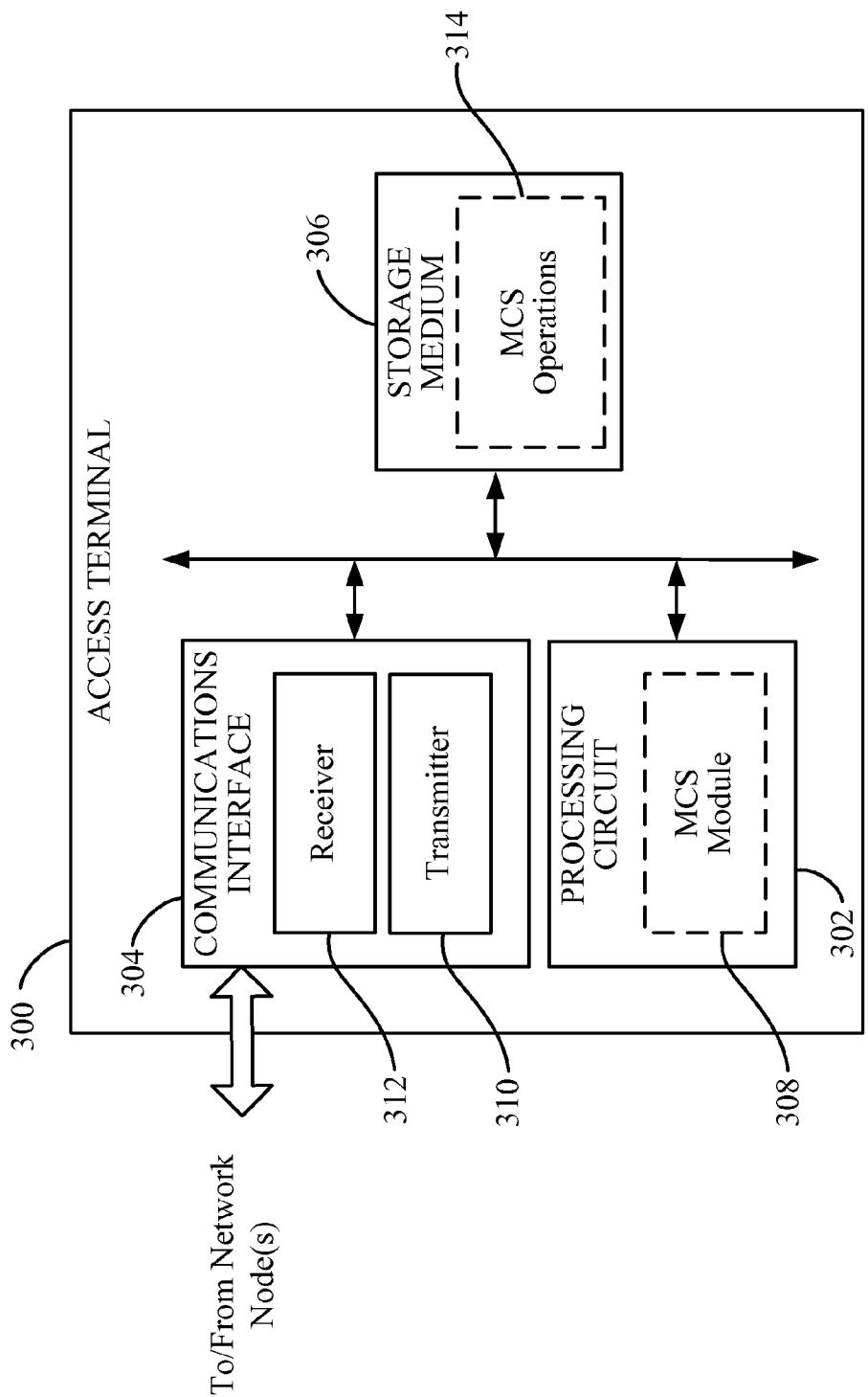
FIG. 3 is a block diagram illustrating select components of an access terminal according to at least one example.

Turning to FIG. 3, a block diagram is shown illustrating select components of an access terminal 300 according to at least one example of the present disclosure. The access terminal 300, which may be employed as an access terminal 104 depicted in FIGS. 1 and 2, may include a processing circuit 302 coupled to or placed in electrical communication with a communications interface 304 and a storage medium 306.

The processing circuit 302 is arranged to obtain, process and/or send data, control data access and storage, issue commands, and control other desired operations. The processing circuit 302 may include circuitry configured to implement desired programming provided by appropriate media in at least one example. For example, the processing circuit 302 may be implemented as one or more processors, one or more controllers, and/or other structure configured to execute executable programming. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. The processing circuit 302 may include various modules capable of processing, including a detection module and a modulation module. Discussion of these module processing modules are discussed in this document and can include description of the processing circuit 302. These examples of the processing circuit 302 are for illustration and other suitable configurations within the scope of the present disclosure are also contemplated.

The processing circuit 302 is adapted for processing, including the execution of programming, which may be stored on the storage medium 306. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 302 may include a modulation and/or coding scheme (MCS) module 308. The modulation and coding scheme (MCS) module 308 may include circuitry and/or programming (e.g., programming stored on the storage medium 306) adapted to, among other things, identify a transmission conflict and select or change a modulation and coding scheme for a data block in response to the transmission conflict.

The communications interface 304 is configured to facilitate wireless communications of the access terminal 300. For example, the communications interface 304 may include circuitry and/or programming adapted to facilitate the communication of information bi-directionally with respect to one or more network nodes. The communications interface 304 may be coupled to one or more antennas (not shown), and includes wireless transceiver circuitry, including at least one transmitter 310 (e.g., one or more transmitter chains) and/or at least one receiver 312 (e.g., one or more receiver chains).

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing or carrying programming. By way of example and not limitation, the storage medium 306 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the access terminal 300, external to the access terminal 300, distributed across multiple entities).

Programming stored by the storage medium 306, when executed by the processing circuit 302, causes the processing circuit 302 to perform one or more of the various functions and/or process steps described herein. For example, the storage medium 306 may include modulation and coding scheme (MCS) operations (or instructions) 314. The MCS operations 314 can be implemented by the processing circuit 302 in, for example, the MCS module 308 to select and/or change a modulation and coding scheme for a data block when a conflict is detected with at least some transmission timeslots of a radio block on which the data block is scheduled to be transmitted. Thus, according to one or more aspects of the present disclosure, the processing circuit 302 may be adapted to perform (in conjunction with the storage medium 306) any or all of the processes, functions, steps and/or routines for any or all of the access terminals described herein (e.g., access terminal 104 or 300). As used herein, the term "adapted" in relation to the processing circuit 302 may refer to the processing circuit 302 being one or more of configured, employed, implemented, or programmed to perform a particular process, function, step and/or routine according to various features described herein.

Figure 4:
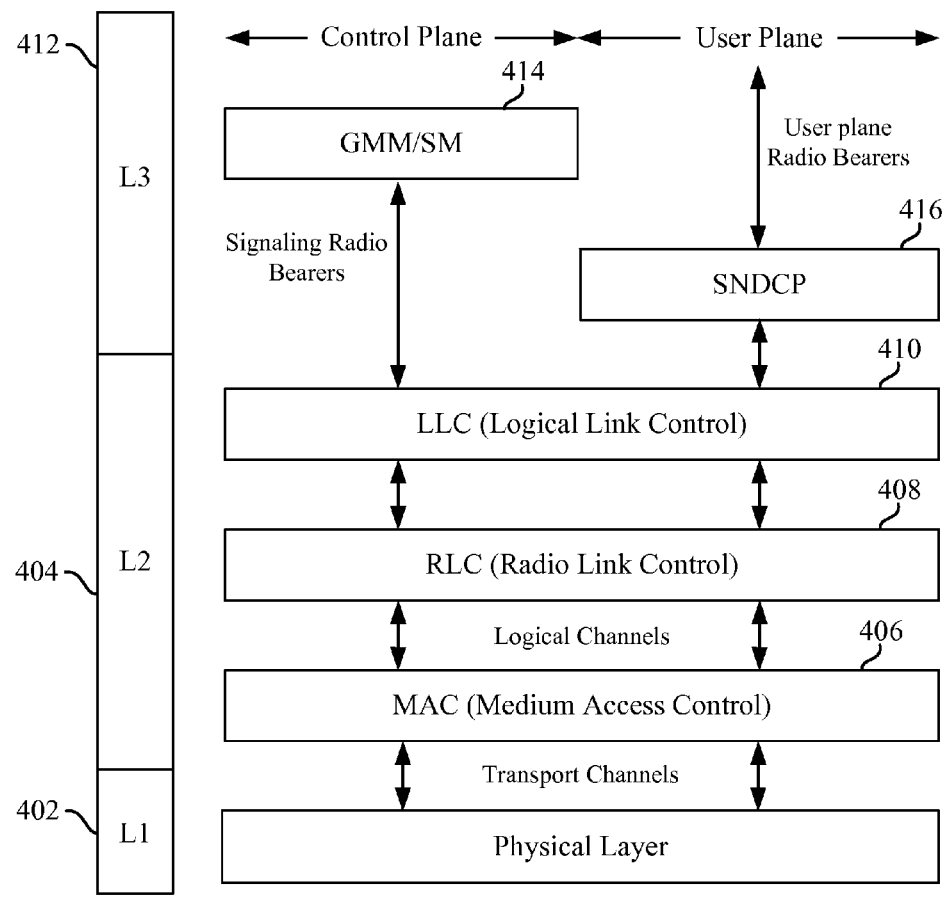
FIG. 4 is a block diagram illustrating an example of a protocol stack architecture which may be implemented by an access terminal.

The access terminal 300 may employ a protocol stack architecture for communicating data with one or more network entities of a wireless communication system (e.g., a base station). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 4 is a block diagram illustrating at least one example of a protocol stack architecture which may be implemented by the access terminal 300. The protocol stack architecture of FIG. 4 is shown to generally include three layers: Layer 1 (L1), Layer 2 (L2), and Layer 3 (L3). In the illustrated example, the user plane (or data plane) carries user traffic (e.g., voice services, data services), while the control plane carries control information (e.g., signaling).

Layer 1 402 is the lowest layer and implements various physical layer signal processing functions. Layer 1 402 is also referred to herein as the physical layer 402. This physical layer 402 provides for the transmission and reception of radio signals between the access terminal 104 and a base station 102.

The data link layer, called layer 2 (or "the L2 layer") 404 is above the physical layer 402 and is responsible for delivery of signaling messages generated by Layer 3. The L2 layer 404 makes use of the services provided by the physical layer 402.

The L2 layer 404 may include various sublayers, including a Medium Access Control (MAC) sublayer 406, a Radio Link Control (RLC) sublayer 408, and a Logical Link Control (LLC) sublayer 410.

The MAC sublayer 406 is the lower sublayer of the L2 layer 404. The MAC sublayer 406 implements the medium access protocol and is responsible for transport of higher layers' protocol data units using the services provided by the physical layer 402. The MAC sublayer 406 may manage the access of data from the higher layers to the shared air interface by providing multiplexing between logical and transport channels.

The RLC sublayer 408 provides segmentation and reassembly of upper layer data packets, retransmission of lost data packets, and reordering of data packets to compensate for out-of-order reception. The RLC sublayer 408 makes use of the services provided by the lower layers (e.g., layer 1 and the MAC sublayer).

The LLC sublayer 410 provides flow and sequence control, as well as error control. For example, the LLC sublayer 410 may be responsible for the framing of the user data packets and signaling messages of the mobility management and session management subsystem of the SGSN (e.g., SGSN 212 in FIG. 2). The LLC sublayer 410 may also ensure a reliable connection between the access terminal 300 and the SGSN (e.g., SGSN 212 in FIG. 2) by using an acknowledgement mechanism for correctly received blocks.

Layer 3 412, which may also be referred to as the upper layer or the L3 layer, makes use of the services provided by the L2 layer. The L3 layer 412 includes a GPRS Mobility Management and Session Management (GMM/SM) layer 414 in the control plane and a Subnetwork Dependent Convergence Protocol (SNDCP) layer 416 in the user plane. The GMM/SM layer 414 is where signaling messages originate and terminate according to the semantics and timing of the communication protocol between a base station 102 and the access terminal 104. The SNDCP layer 416 provides multiplexing between different radio bearers and logical channels. The SNDCP layer 416 can also provide header compression for upper layer data packets to reduce radio transmission overhead, security by ciphering the data packets, and handover support for the access terminal 300 between base stations (e.g., base stations 102 in FIG. 1).

Although FIG. 4 illustrates various layers and sublayers of the protocol stack, it should be understood that the access terminal 300 may employ additional, fewer, or different layers and/or sublayers according to various implementations.

Figure 5:
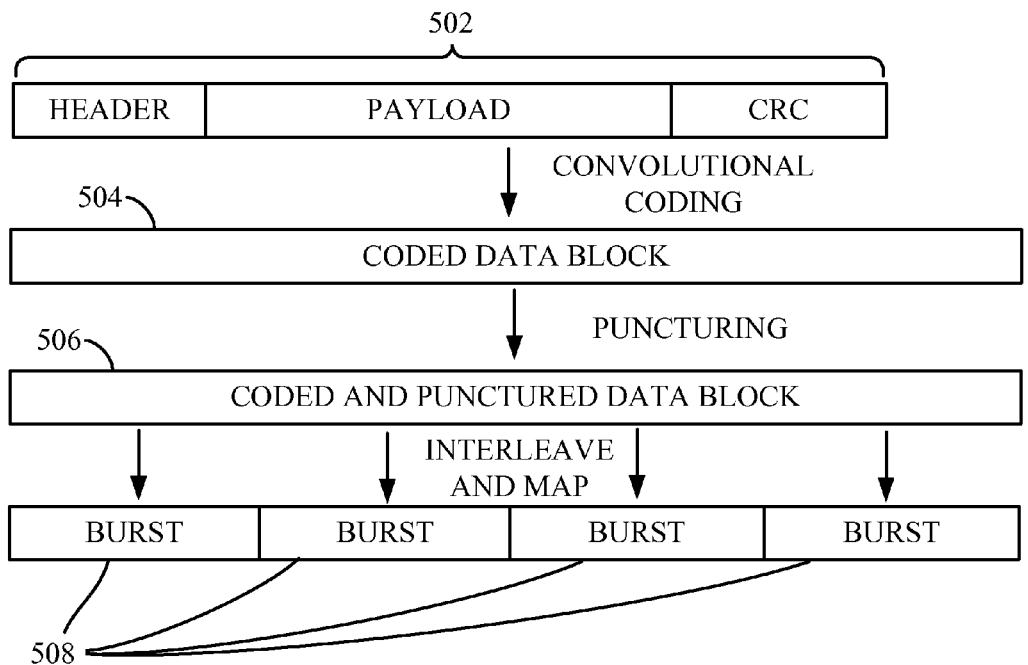
FIG. 5 is a block diagram illustrating at least some of the stages associated with transmitting data from a wireless communications device in accordance with at least one example.

The access terminal 300 may wirelessly communicate information by transmitting binary bits over an air interface to a network entity (e.g., a base station). For example, as shown in FIG. 5, a data block 502 including a header, a data payload and a checksum can be convolutionally encoded, as shown by the coded data block 504. Convolutional encoding provides redundancy for error correction to compensate for bit errors caused by noise and interference over the air interface. In some instances, some of the redundant bits generated by convolutional encoding may be punctured to increase the rate of the convolutional code and reduce the redundancy per data block transmitted. Puncturing additionally lowers the bandwidth requirements such that the convolutionally encoded signal fits into the available channel bit stream. The convolutionally encoded (and optionally punctured) data block 506 can be interleaved to change the bit order according to a specified pattern. Interleaving reduces the chance that several consecutive bits are changed during transmission, which may result in a receiving device being unable to correctly reconstruct the originally sent data block from the received transmissions.

Figure 6:
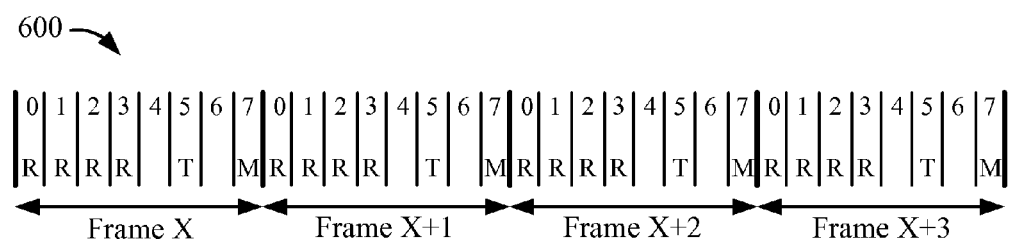
FIG. 6 is a block diagram illustrating at least one example of a configuration for a radio block.

The reordered and encoded bits are mapped to a plurality of RF bursts 508 (typically four RF bursts), and each RF burst 508 is transmitted individually until all RF bursts 508 are transmitted. In some examples, each RF burst 508 is transmitted in one frame of a radio block. For example, FIG. 6 shows a block diagram of at least one example of a configuration for a radio block 600. As illustrated, the radio block 600 includes four frames identified as Frame X, Frame X+1, Frame X+2 and Frame X+3. Each frame includes eight timeslots, numbered from 0 through 7. In this example, each of the four frames includes one transmission timeslot (T) in timeslot 5. The transmission timeslot (T) is the timeslot during which the access terminal 300 transmits one of the RF bursts 508 on the uplink. In the illustrated example, the radio block 600 facilitates uplink transmission of four RF bursts 508 (e.g., one RF burst in each of the four frames of the radio block 600). Each frame also includes four reception timeslots (R) scheduled for receiving downlink transmissions. For instance, the access terminal 300 can receive one RF burst in each reception timeslot (R) for receiving the four downlink RF bursts of a data transmission in a single frame. Each frame also includes a power measurement timeslot (M) during which the access terminal 300 performs power measurements for one or more neighboring cells.

The particular convolutional coding scheme, puncturing scheme, interleaving scheme, and/or modulation scheme for modulating the data block to an RF burst which are employed by the access terminal 300 for the transmission of data may be determined according to one or more predefined schemes. For an access terminal 300 adapted to facilitate EGPRS (Enhanced General Packet Radio Service) communications, a plurality of modulation and coding schemes (MCSs) are available, which are typically identified by those of skill in the art as MCS-1, MCS-2, MCS-3, MCS-4, MCS-5, MCS-6, MCS-7, MCS-8, and MCS-9. Based on the quantity of data bits that the modulation and coding schemes are capable of transmitting in a single data block, MCS-1 through MCS-6 may be identified as single-payload schemes, while MCS-7, MCS-8, and MCS-9 can be identified as dual-payload schemes. As such technologies progress toward EGPRS-2A and EGPRS-2B, additional modulation and coding schemes may be employed. EGPRS-2A can employ modulation and coding schemes capable of even further increases in data rates and can be referred to herein as triple-payload modulation and coding schemes. EGPRS-2B can also employ modulation and coding schemes capable of further increases in data rates and can be referred to herein as quadruple-payload modulation and coding schemes. Throughout the present disclosure, modulation and coding schemes capable of dual-payload, triple-payload, quadruple-payload or higher data transmission rates are referred herein as multi-payload schemes.

As the access terminal 300 communicates within a wireless communications system (e.g., wireless communications system 100 in FIGS. 1 and 2), the access terminal 300 may perform various periodic activities at times when reception and/or transmission of data would generally occur. For example, the access terminal 300 may periodically reconfirm timing synchronizations (e.g., synchronization channel (SCH) reconfirmations) with various neighboring cells, confirm various parameters for the serving cell and/or for one or more neighboring cells by monitoring associated broadcast control channels (BCCHs), monitor a paging channel (PCH), etc.

Figure 7:
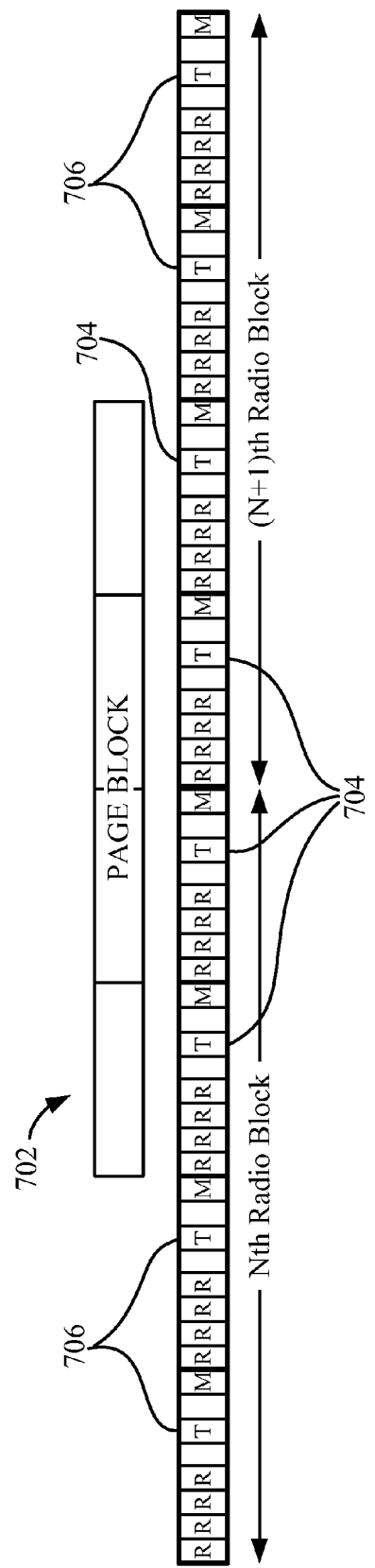
FIG. 7 is a block diagram illustrating at least one example of a situation in which a conflict occurs on one or more transmission timeslots of a radio block.

When the access terminal 300 conducts one of these periodic activities, a conflict at the physical layer (e.g., the physical layer 402 in FIG. 4) may occur. In response to such a conflict at the physical layer, the access terminal 300 will suspend any active data transfer until there is no more conflict. For instance, FIG. 7 illustrates two consecutive radio blocks labeled as an Nth radio block and a (N+1)th radio block. In this example, the access terminal 300 is scheduled to conduct a periodic activity identified as monitoring a paging channel (PCH). In the depicted example, a page block 702 is scheduled to be monitored during the last two frames of the Nth radio block and during the first two frames of the (N+1)th radio block, resulting in a conflict at the physical layer. As a result of the conflict at the physical layer between the page block 702 and the identified frames of the Nth radio block and (N+1)th radio block, the access terminal 300 will typically cancel the last two frames of the Nth radio block and the first two frames of the (N+1)th radio block, including the transmission timeslot 704 scheduled for each of these four frames.

The cancellation of the transmission timeslots 704 for conducting one of the periodic activities does not preclude the access terminal 300 from transmitting data during the transmission timeslots in each radio block that are not cancelled. Accordingly, the access terminal 300 can transmit information during the transmission timeslots 706 that were not cancelled. That is, the access terminal 300 can transmit an RF burst associated with a data block in each of the transmission timeslots 706 of the first two frames of the Nth radio block, while the remaining two RF bursts of the data block that would normally have been sent during the transmission timeslots 704 in last two frames of the Nth radio block are cancelled. Similarly, an RF burst associated with another data block can be transmitted in each of the transmission timeslots 706 of the last two frames in the (N+1)th radio block, while the two RF bursts of the data block that would normally have been sent during the transmission timeslots 704 in first two frames of the (N+1)th radio block are cancelled.

When the access terminal 300 prepares and transmits a data block according to the modulation and coding scheme MCS-7, MCS-8, MCS-9, or a modulation and coding scheme associated with EGPRS-2A or EGPRS-2B, the cancellation of two transmission timeslots may result in a loss of the entire data block. That is, a receiving device (e.g., a network entity) may not be able to decode the data block when one or more RF bursts are lost for a data block employing MCS-7, MCS-8, MCS-9, or a modulation and coding schemes associated with EGPRS-2A or EGPRS-2B. As a result, when the data blocks transmitted in the Nth radio block and in the (N+1)th radio block employ MCS-7, MCS-8, MCS-9, or a modulation and coding scheme associated with EGPRS-2A or EGPRS-2B, these data blocks will be lost because of the two RF bursts lost from cancellation of the two transmission timeslots 704. On the other hand, a data block employing a lower modulation and coding scheme, such as MCS-1, MCS-2, MCS-3, MCS-4, MCS-5, or MCS-6 is capable of being decoded by the receiving device even when one or two of the four RF bursts are lost.

Accordingly, the access terminal 300 is adapted to detect such conflicts at the physical layer resulting, for example, from a periodic activity, and employ a modulation and coding scheme capable of being decoded based on the number of transmission timeslots that are not conflicted. Detection can be accomplished using a detection module. For instance, the access terminal 300 can select or change the modulation and coding scheme of the data block to a single-payload modulation and coding scheme. In some examples where a modulation and coding scheme has not yet been selected for a data block, the access terminal 300 may select a single-payload modulation and coding scheme for a data block scheduled for transmission during the Nth radio block and for a data block scheduled for transmission during the (N+1) the radio block in FIG. 7, since both radio blocks include two transmission timeslots on which two RF bursts for respective data blocks can be transmitted. In other examples where a modulation and coding scheme has already been selected for a data block, the access terminal 300 may change the data block from a multi-payload modulation and coding scheme to a single-payload modulation and coding scheme. Some of the RF bursts for the data block can then be transmitted according to the selected or changed modulation and coding scheme during transmission timeslots that are not cancelled.

Referring to FIG. 7, if the access terminal 300 determines that there is a conflict between another activity (e.g., the page block 702) and the transmission timeslots 704 in the last two frames of the Nth radio block, then the access terminal 300 can select the modulation and coding scheme of the data block or change the modulation and coding scheme of the data block based on the conflict. With the selected or new modulation and coding scheme, the first two RF bursts of the data block are transmitted during the respective transmission timeslots 706 in the Nth radio block, while the last two RF bursts of the data block are cancelled because of the conflict with the page block 702.

Figure 8:
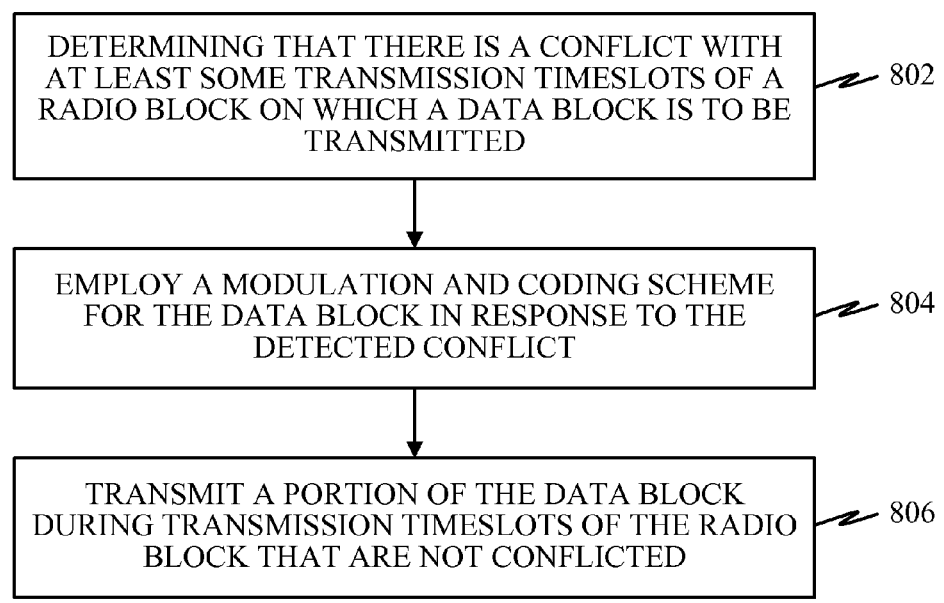
FIG. 8 is a flow diagram illustrating an example of a method operational on an access terminal according to at least one example.

Turning to FIG. 8, a flow diagram is illustrated showing at least one example of a method operational on an access terminal, such as the access terminal 300. With reference to FIGS. 3 and 8, an access terminal 300 may determine that there is a conflict with at least some transmission timeslots of a radio block on which a data block is to be transmitted at step 802. For example, the processing circuit 302 (e.g., the MCS module 308) executing the MCS operations 314 may detect that one or more transmission timeslots on which the RF bursts of the radio block are scheduled to be transmitted will be cancelled because of a conflict. The processing circuit 302 (e.g., the MCS module 308) executing the MCS operations 314 may detect the conflict at a physical layer of the protocol stack (e.g., the physical layer 402).

Such a conflict may include a conflict between the one or more transmission timeslots and a periodic activity including, but not limited to, a synchronization channel (SCH) reconfirmation for a neighboring cell, confirmation of one or more parameters for the serving cell and/or for one or more neighboring cells by monitoring associated broadcast control channels (BCCHs), monitoring a paging channel (PCH), etc. By way of illustrating and not limitation, referring back to FIG. 7, the processing circuit 302 (e.g., the MCS module 308) executing the MCS operations 314 may determine that the transmission timeslots 704 of the Nth Radio block will be cancelled because of a conflict with the page block 702.

Referring again to FIGS. 3 and 8, in response to determining that there is a conflict at step 802, the access terminal 300 may employ a modulation and coding scheme for the data block at step 804. For example, the processing circuit 302 (e.g., the MCS module 308) executing the MCS operations 314 may employ a modulation and coding scheme for the data block based on the detected conflict (e.g., based on the number of timeslots that are conflicted). As set forth above with reference to FIG. 5, employing a modulation and coding scheme for the data block (e.g., the data block 502 in FIG. 5) can include employing conventional algorithms for convolutional coding, puncturing (depending on the modulation and coding scheme), interleaving, mapping and modulating to four RF bursts.

In some instances, the access terminal 300 can select a modulation and coding scheme to be applied to the data block based on the knowledge of the detected conflict at step 802 prior to application of any other modulation and coding scheme to the data block. For example, the determination that there is a conflict may occur before the data block is prepared for transmission with a modulation and coding scheme. In such instances, the processing circuit 302 (e.g., the MCS module 308) executing the MCS operations 314 can select the original (or initial) modulation and coding scheme for the data block in response to the detected conflict.

In other instances, the access terminal 300 may have already prepared the data block for transmission according to a multi-payload modulation and coding scheme prior to detecting the conflict at step 802. For example, the processing circuit 302 may have prepared the data block for transmission with a dual-payload modulation and coding scheme (e.g., MCS-7, MCS-8, MCS-9), a triple-payload modulation and coding scheme (e.g., a modulation and coding scheme associated with EGPRS-2A), or a quadruple-payload modulation and coding scheme (e.g., a modulation and coding scheme associated with EGPRS-2B). With the data block prepared for transmission according to the particular multi-payload modulation and coding scheme, the access terminal 300 detect the conflict at step 802. In such a case, employing a modulation and coding scheme for the data block in response to the detected conflict at step 802 can include changing the modulation and coding scheme. For example, the processing circuit 302 (e.g., the MCS module 308) executing the MCS operations 314 may adjust the original modulation and coding scheme for the data block to a different modulation and coding scheme. That is, the processing circuit 302 (e.g., the MCS module 308) executing the MCS operations 314 can apply a new modulation and coding scheme to the content of the data block.

In some examples, the multi-payload modulation and coding scheme may be changed to a single-payload modulation and coding scheme. In EGPRS capable wireless communication systems, the available modulation and coding schemes are organized into three code families, and switching to different modulation and coding schemes within the same family can be more easily facilitated. For instance, MCS-9, MCS-8, MCS-6, and MCS-3 are all included in family 'A', MCS-7, MCS-5, and MCS-2 are all included in family 'B', and MCS-4 and MCS-1 are included in family 'C'. Accordingly, in various examples, a data block prepared for transmission according to the multi-payload MCS-9 or MCS-8 can be readily adjusted in step 804 to a single-payload MCS-6 or MCS-3. Similarly, a data block prepared for transmission according to the multi-payload MCS-7 can be readily adjusted in step 804 to a single-payload MCS-5 or MCS-2.

In some instances, the previously applied multi-payload modulation and coding scheme may be a triple-payload modulation and coding scheme. Such a triple-payload modulation and coding scheme may be adjusted at step 804 to a single-payload modulation and coding scheme. In other instances, the previously applied multi-payload modulation and coding scheme may be a quadruple-payload modulation and coding scheme. Such a quadruple-payload modulation and coding scheme may be adjusted at step 804 to a single-payload modulation and coding scheme.

After the modulation and coding scheme is employed for the data block, the access terminal 300 can transmit a portion of the data block during transmission timeslots of the radio block that are not conflicted at step 806. For example, the processing circuit 302 may transmit a portion of the data block via the communications interface 304 during transmission timeslots of the radio block that are not conflicted. Only a portion of the encoded data block can be transmitted because at least one transmission timeslot of the radio block is conflicted. That is, without all four transmission timeslots in the radio block, at least one RF burst for the data block will not be transmitted. By way of illustration and not limitation, referring to FIG. 7, the processing circuit 302 may transmit RF bursts of the data block (e.g., RF bursts 508 in FIG. 5) during the transmission timeslots 706 of the Nth radio block that are not conflicted. Although the RF bursts scheduled to be transmitted during the conflicted transmission timeslots 704 are cancelled, the first two RF bursts will still be transmitted in the example depicted in FIG. 7. In this example, the processing circuit 302 may determine that only two transmission timeslots 706 are not conflicted, and may accordingly select a modulation and coding scheme at step 806 that is capable of being decoded when only two RF bursts are received (e.g., a single-payload modulation and coding scheme).

Since the modulation and coding scheme is adjusted by the access terminal, the transmission of the two RF bursts can be sufficient for a receiving device to successfully decode the data block. Without changing the multi-payload modulation and coding scheme, the data block would have been lost if only two RF bursts are transmitted. The loss of the data block (e.g., the data block transmitted in the Nth radio block in FIG. 7) would typically result in a reduction of throughput, since the access terminal 300 will have to wait until the next full radio block to transmit all four RF bursts of the data block. As a result of changing the modulation and coding scheme according to the examples and principles described in this disclosure, access terminals can increase the data throughput on the uplink by avoiding or even eliminating the loss of uplink data blocks when there is a conflict.

While the above discussed aspects, arrangements, and embodiments are discussed with specific details and particularity, one or more of the components, steps, features and/or functions illustrated in FIGS. 1, 2, 3, 4, 5, 6, 7 and/or 8 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, and/or 3 may be configured to perform or employ one or more of the methods, features, parameters, protocols or steps described in FIGS. 4, 5, 6, 7 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
   a communications interface;
   a storage medium; and
   a processing circuit coupled to the communications interface and the storage medium, the processing circuit adapted to:
      detect a conflict for wireless communication resources of the communications interface between one or more transmission timeslots of a radio block on which a data block is to be transmitted and an other activity;
      employ a modulation and coding scheme for the data block in response to the detected conflict; and
      transmit via the communications interface a portion of the data block during transmission timeslots of the radio block that are not conflicted with the other activity.

2. The access terminal of claim 1, wherein the processing circuit is further adapted to prepare the data block for transmission according to a multi-payload modulation and coding scheme prior to detecting the conflict.

3. The access terminal of claim 1, wherein the conflict is detected when the data block is processed at a physical layer of a protocol stack employed for transmission of the data block.

4. The access terminal of claim 1, wherein the detected conflict comprises a conflict between the one or more transmission timeslots of the radio block and a periodic activity.

5. The access terminal of claim 1, wherein the processing circuit adapted to employ the modulation and coding scheme for the data block in response to the detected conflict comprises the processing circuit adapted to change the modulation and coding scheme for the data block in response to the detected conflict.

6. The access terminal of claim 5, wherein the processing circuit is adapted to change the modulation and coding scheme for the data block from a multi-payload modulation and coding scheme to a single-payload modulation and coding scheme.

7. The access terminal of claim 5, wherein the processing circuit is adapted to change the modulation and coding scheme for the data block from a dual-payload modulation and coding scheme to a single-payload modulation and coding scheme.

8. The access terminal of claim 7, wherein the processing circuit is adapted to change the modulation and coding scheme for the data block from MCS-9 to MCS-6.

9. The access terminal of claim 7, wherein the processing circuit is adapted to change the modulation and coding scheme for the data block from MCS-8 to MCS-6.

10. The access terminal of claim 7, wherein the processing circuit is adapted to change the modulation and coding scheme for the data block from MCS-7 to MCS-5.

11. The access terminal of claim 7, wherein the processing circuit is adapted to change the modulation and coding scheme for the data block from a triple-payload modulation and coding scheme to a single-payload modulation and coding scheme.

12. The access terminal of claim 7, wherein the processing circuit is adapted to change the modulation and coding scheme for the data block from a quadruple-payload modulation and coding scheme to a single-payload modulation and coding scheme.

13. The access terminal of claim 1, wherein the processing circuit adapted to employ the modulation and coding scheme for the data block in response to the detected conflict comprises the processing circuit adapted to select an initial modulation and coding scheme for the data block in response to the detected conflict.

14. A method operational on an access terminal, comprising:
   determining that there is a conflict for wireless communication resources between one or more transmission timeslots of a radio block on which a data block is scheduled to be transmitted and an other activity on the access terminal;
   employing a modulation and coding scheme for the data block in response to the determination that there is a conflict; and
   transmitting a portion of the data block during transmission timeslots of the radio block that are not conflicted with the other activity.

15. The method of claim 14, wherein determining that there is a conflict for wireless communication resources between the one or more transmission timeslots of a radio block on which a data block is scheduled to be transmitted and an other activity on the access terminal comprises:
   determining during processing of the data block at a physical layer of a protocol stack employed for transmission of the data block that there is a conflict with at least some the one or more transmission timeslots of the radio block.

16. The method of claim 14, wherein determining that there is a conflict for wireless communication resources between the one or more transmission timeslots of the radio block on which a data block is scheduled to be transmitted and the other activity on the access terminal comprises:
   determining that there is a conflict between the one or more transmission timeslots of the radio block and a periodic activity.

17. The method of claim 14, further comprising:
   preparing the data block for transmission according to a multi-payload modulation and coding scheme prior to determining that there is a conflict; and
   wherein employing the modulation and coding scheme for the data block in response to the determination that there is a conflict comprises changing the multi-payload modulation and coding scheme for the data block in response to the determination that there is a conflict.

18. The method of claim 17, wherein changing the modulation and coding scheme for the data block comprises:

changing the modulation and coding scheme for the data block from the multi-payload modulation and coding scheme to a single-payload modulation and coding scheme.

19. The method of claim 14, wherein employing a modulation and coding scheme for the data block in response to the determination that there is a conflict comprises:
selecting an initial modulation and coding scheme for the data block in response to the determination that there is a conflict.

20. An access terminal, comprising:
means for detecting a conflict for wireless communication resources between one or more transmission timeslots of a radio block on which a data block is scheduled to be transmitted and an other activity on the access terminal;
means for employing a modulation and coding scheme for the data block in response to the detected conflict; and
means for transmitting a portion of the data block during transmission timeslots of the radio block that are not conflicted with the other activity.

21. The access terminal of claim 20, wherein the conflict is detected when the data block is processed at a physical layer of a protocol stack employed for transmission of the data block.

22. The access terminal of claim 20, further comprising:
means for preparing the data block for transmission according to a multi-payload modulation and coding scheme before detecting the conflict; and
wherein the modulation and coding scheme is employed by changing the modulation and coding scheme for the data block in response to the detected conflict.

23. The access terminal of claim 22, wherein the modulation and coding scheme for the data block is changed from the multi-payload modulation and coding scheme to a single-payload modulation and coding scheme.

24. The access terminal of claim 20, wherein the modulation and coding scheme is employed by selecting an initial modulation and coding scheme for the data block in response to the detected conflict.

25. A non-transitory computer-readable medium, comprising programming operational on an access terminal for:
determining that there is a conflict for wireless communication resources between one or more transmission timeslots of a radio block on which a data block is to be transmitted and another activity on the access terminal;
employing a modulation and coding scheme for the data block in response to the determination that there is a conflict; and
transmitting a portion of the data block during transmission timeslots of the radio block that are not conflicted with the other activity.

26. The computer-readable medium of claim 25, wherein determining that there is a conflict for wireless communication resources between one or more transmission timeslots of the radio block on which the data block is scheduled to be transmitted and another activity on the access terminal comprises:
determining during processing of the data block at a physical layer of a protocol stack employed for transmission of the data block that there is a conflict between the one or more transmission timeslots of the radio block and the other activity on the access terminal.

27. The computer-readable medium of claim 25, wherein determining that there is a conflict between the one or more transmission timeslots of the radio block and the other activity on the access terminal comprises:
determining that there is a conflict between the one or more transmission timeslots of the radio block and a periodic activity.

28. The computer-readable medium of claim 25, further comprising programming operational on an access terminal for:
preparing the data block for transmission according to a multi-payload modulation and coding scheme; and
wherein employing the modulation and coding scheme for the data block in response to the determination that there is a conflict comprises changing the multi-payload modulation and coding scheme for the data block in response to the determination that there is a conflict.

29. The computer-readable medium of claim 28, wherein changing the modulation and coding scheme for the data block comprises:
changing the modulation and coding scheme for the data block from the multi-payload modulation and coding scheme to a single-payload modulation and coding scheme.

30. In a communication system comprising one or more components configured for wireless communication, a communication device configured for wireless communication, the device comprising:
a detector module configured to detect a conflict for wireless communication resources between one or more transmission timeslots of a radio block on which a data block is to be transmitted and another activity;
a modulation module configured to modulate and code the data block in response to the detected conflict; and
a communications interface to transmit a portion of the data block during transmission timeslots of the radio block that are not conflicted with the other activity.

* * * * *